United States Patent [19]
Eick et al.

[11] Patent Number: 5,835,085
[45] Date of Patent: *Nov. 10, 1998

[54] GRAPHICAL DISPLAY OF RELATIONSHIPS

[75] Inventors: Stephen Gregory Eick, Naperville; Graham John Wills, Lisle, both of Ill.

[73] Assignee: Lucent Technologies Inc., Murray Hill, N.J.

[ * ] Notice: The term of this patent shall not extend beyond the expiration date of Pat. No. 5,596,703.

[21] Appl. No.: 915,511

[22] Filed: Aug. 13, 1997

Related U.S. Application Data

[63] Continuation of Ser. No. 667,997, Jun. 19, 1996, abandoned, which is a continuation of Ser. No. 141,885, Oct. 22, 1993, Pat. No. 5,596,703.

[51] Int. Cl.[6] ..................................................... G06F 3/14
[52] U.S. Cl. .............................................. 345/326; 345/440
[58] Field of Search ..................................... 345/440, 326, 345/335, 339, 356, 357, 961, 969; 379/96, 243, 247

[56] References Cited

U.S. PATENT DOCUMENTS

| | | | |
|---|---|---|---|
| 4,464,543 | 8/1984 | Kline et al. | 379/224 |
| 4,710,763 | 12/1987 | Franke et al. | 345/10 |
| 4,953,106 | 8/1990 | Gansner et al. | 345/440 |
| 5,136,690 | 8/1992 | Becker et al. | 345/349 |
| 5,179,643 | 1/1993 | Homma et al. | 345/440 |
| 5,270,919 | 12/1993 | Blake et al. | 340/827 |
| 5,276,789 | 1/1994 | Besaw et al. | 345/440 |
| 5,426,674 | 1/1995 | Nemrovsky et al. | 395/200.71 |
| 5,450,535 | 9/1995 | North | 345/440 |
| 5,596,703 | 1/1997 | Eick et al. | 345/326 |
| 5,623,590 | 4/1997 | Becker et al. | 345/326 |

*Primary Examiner*—Matthew M. Kim
*Assistant Examiner*—Crescelle N. dela Torre
*Attorney, Agent, or Firm*—Ronald D. Slusky

[57] ABSTRACT

Apparatus for providing displays in which the locations of nodes of a graph relative to each other are a function of the significance of a relationship between the nodes. The technique used to locate the nodes produces groups of nodes with significant relationships to each other which are set visually apart from the other nodes. The relationships between the nodes are defined by using a statistic to give weights to links between the nodes. Statistics may also be used to determine the size, shape, and color of the nodes and the color and width of the links. The display may also include histograms which show the numbers of links or nodes which have given values of the statistics and which relate the colors in which the nodes and links are displayed to values of the statistics. The histograms may further be used to interactively define masks for links and nodes, and masked links and nodes are not taken into account in making the display.

1 Claim, 4 Drawing Sheets

GRAPH LISTS 201

GRAPHICAL DISPLAY OF RELATIONSHIPS

This application is a continuation of application Ser. No. 08/667,997, filed on Jun. 19, 1996, now abandoned which is a continuation of Ser. No. 08/141,885 filed Oct. 22, 1993, now U.S. Pat. No. 5,596,703.

BACKGROUND OF THE INVENTION

1. Field of the Invention

The invention relates generally to the graphical display of information and more particularly to the graphical display of information which can be represented as a graph consisting of nodes and edges.

2. Description of the Prior Art

Graphs made up of nodes and edges have long been used to represent entities and a relationship between them. For example, a telephone call from a caller to a callee may be represented by two nodes, one representing the caller and the other the callee, and an edge which connects the nodes and represents the call.

With the advent of digital computer systems with sufficient power to drive large high-resolution displays, graphs began to be used to visually represent information accessible to the computer system on displays. Moreover, users of the computer systems could use input devices such as a mouse or a keyboard to interact with the displayed graphs. In many cases, the input device could move a pointer in the display, and the interaction with the graphs depended on the location of the pointer in the display.

One example of an interactive display system which employs graphs is the system disclosed in U.S. Pat. No. 5,136,690, Becker et al., Dynamic Graphical Analysis of Network Data, issued Aug. 4, 1992. FIG. 6 herein is FIG. 2 of that patent. As shown in FIG. 6, the display of that system has a map 600 of the continental United States upon which nodes are displayed which represent AT&T's switching centers. The edges connecting the nodes represent various statistics concerning the flow of traffic between the nodes. In FIG. 6, edge 603 can be seen connecting nodes 601 and 602. The edges in the figure represent blocked calls between the nodes. FIG. 6 shows blocked calls immediately after a serious earthquake in California.

As is immediately apparent from FIG. 6, a major problem of displays like those of FIG. 6 is clutter, that is, the tendency of the display to become unreadable as the amount of data it displays increases. Thus, in FIG. 6, the sheer volume of blocked calls results in so many edges 603 in the display that large portions of the display are hidden and individual edges cannot be distinguished. Another example of the same problem may be found in Michael F. Schwartz and David C. M. Wood, "Discovering Shared Interests using Graph Analysis", in: *Communications of the ACM*, Vol. 36, no. 8, August 1993, pp. 78–89. See in particular FIG. 3.

To deal with the problem of clutter, Becker's system includes controls which permit the user to interactively modify the display to reduce clutter. The controls are operated by using a pointing device such as a mouse to move a pointer 640 in the display to the control and then using a button on the mouse to specify an action.

The first of these controls is slider 606, which the user can employ to reduce clutter by interactively increasing or decreasing the portions of edges 603 which are actually displayed. At the "short" extreme, no edges 603 are shown; at the "long" extreme, the entire length of each edge 603 is shown. At intermediate positions, a part of the middle portion of each edge is not shown, with the amount not shown being proportional to the position of the slider.

Slider 610 relates data values to colors and also permits the user to reduce clutter by interactively establishing display thresholds. Slider 610 is divided into different-colored areas (area 651, for example), each one of which represents a range of the values represented by the edges. Edges representing values which fall within a color's range are displayed in that color. The user may interactively define an upper threshold, a lower threshold, or both in slider 610. Only those edges 603 are displayed whose values lie below the upper threshold (if there is one) and above the lower threshold (if there is one).

Users may further reduce clutter by deactivating nodes. This is done by using the mouse to move the pointer to a node and then depressing a button on the mouse. The node is displayed in a different color and the edges connecting the node to the other nodes are not displayed. The user may reactivate an inactive node in the same fashion.

Buttons in the lower right-hand corner of FIG. 6, finally, permit the user to "zoom" into or out of an area of the display, to extend an edge 603 which is not being completely displayed, and to toggle between a display of the presently-active nodes and a display of the presently-inactive nodes.

SUMMARY OF THE INVENTION

While the techniques disclosed in Becker for the reduction of clutter are helpful, they do not address the fundamental cause of the clutter: the use of the positions of the various nodes 601 to show geographic location fixes them in the display, and consequently, the nodes 601 cannot be rearranged to reduce either the lengths of the edges 603 or the number of other edges 603 which a given edge crosses. It is an object of the present invention to provide a fundamental solution to this problem and thereby to improve the display of graphs.

The invention solves the problem of clutter and increases the clarity of the information displayed in the graph by arranging the nodes of the graph in such fashion that nodes which have more significant relationships with each other than with other nodes are placed in groups in which the density of nodes in the area within a group is higher than the density of nodes in the area around the group. The nodes in the groups are thus visually set apart from other nodes in the area around the group. Additionally, the groups are arranged such that the groups whose nodes have the most significant relationships appear near the center of the area. Thus, if FIG. 6 were displayed according to the principles of the invention, the locations of the nodes would not be fixed by map 600 (and consequently there would be no map 600) and the nodes representing the east coast switches would be in groups at the center of the display.

In graphs displayed according to the principles of the invention, relationships between nodes which would otherwise be hidden become immediately apparent. The invention is thus particularly value in situations where the user of the display wishes to analyze the data from which the display is generated. The invention may be applied in any situation in which information can be represented as a graph and relationships between nodes in the graph can be represented by having the edges represent values of statistics. Among the applications are the display and analysis of calls made through a given local switch, the display and analysis of relationships between files and modules in a large program, and the display and analysis of communications within an organization.

The foregoing and other objects and advantages of the invention will be apparent to one skilled in the art who peruses the following Drawing and Detailed Description, wherein:

Figure 1:
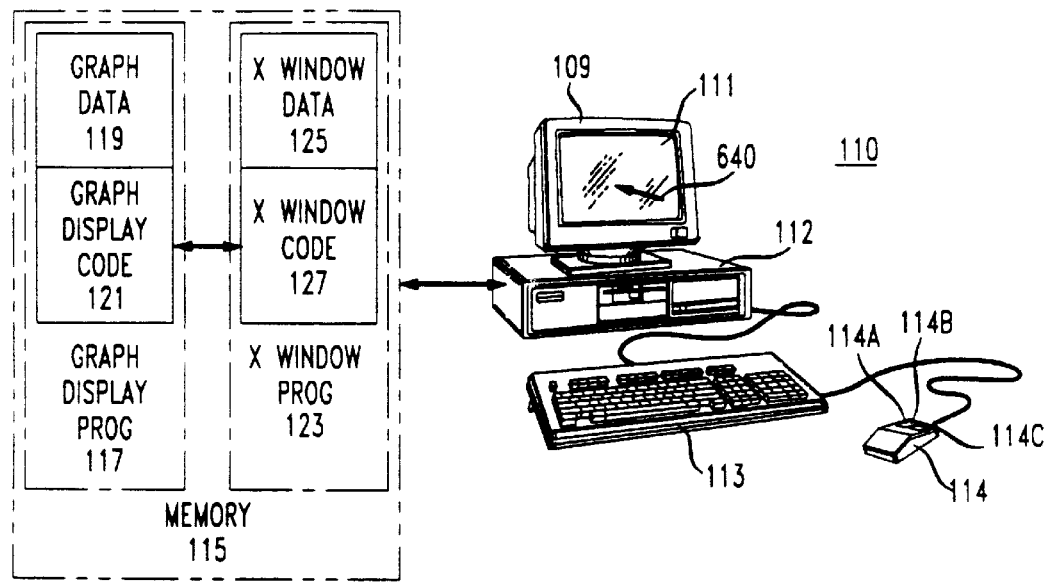
FIG. 1 is a drawing of a computer system in which the invention may be implemented.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first present an overview of the computer system in which a preferred embodiment is implemented, will then discuss a display produced by the preferred embodiment in detail, and will finally describe details of the preferred embodiment.

The Computer System of the Preferred Embodiment: FIG. 1

A preferred embodiment is implemented in a computer system with graphics display capability. FIG. 1 shows such a computer system. Computer system 110 includes system chassis 112, display device 109, and input devices 113 and 114. System chassis 112 includes memory 115, a processor, and a medium such as a disk drive for storing files. The processor generates a display on screen 111 of display device 109 by executing a program stored in memory 115; the program further uses data stored in memory 115. If the program is interactive, its execution is controlled by inputs from interactive input devices 113 and 114. Input device 113 is a keyboard which includes keys for inputting alphanumeric characters and keys for moving pointer 640 in screen 111. Input device 114 is a mouse with three buttons, 114(a), 114(b), and 114(c). Pointer 640 follows the movements of mouse 114, and the buttons may be used in conjunction with the motion and/or location of pointer 640 in screen 111 to further control the execution of the interactive program.

The preferred embodiment is implemented using the graphics environment provided by the well-known X Window System.™ That environment appears in FIG. 1 as X Window Program 123. The program includes X window code 127, whose execution produces the actual displays on screen 111, and X Window Data, which is the data used by the code. What displays X window code 127 produces and how X window code 127 responds to inputs from input devices 113 and 114 is determined by graph display program 117. Graph display program 117 includes a graph display code 121, which calls routines in X Window code 127 and in turn contains routines which are themselves executed by X Window code 127, and graph data 119, which contains the data from which graph display code 121 obtains the information which it provides to X Window 123 to produce a display of the graph on screen 111.

In the preferred embodiment, system 110 is an Iris Indigo manufactured by Silicon Graphics, Inc. The Iris Indigo includes a 50 MHZ IP 20 processor, which also contains a MIPS R4010 floating point chip and a MIPS R4000 CPU chip. The Iris Indigo further includes an LG1 graphics board and 32 Mbytes of main memory.

Figure 3:
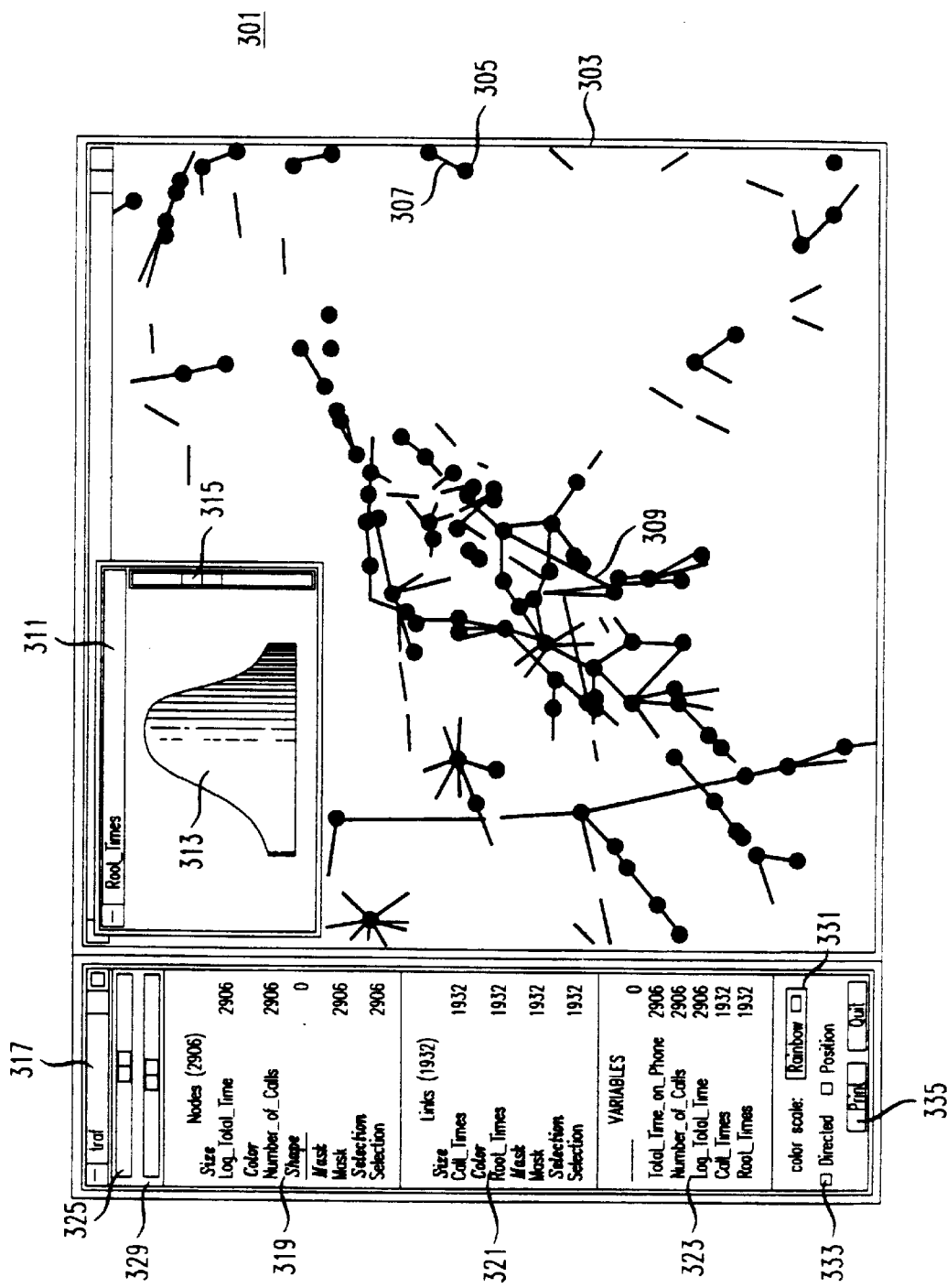
FIG. 3 is drawing of a display produced according to the principles of the invention.

A Display Embodying the Invention: FIG. 3

FIG. 3 shows a display 301 embodying the invention. The display appears on screen 111 of computer system 110 and is controlled by inputs from mouse 114 and keyboard 113. Display 301 is displaying information about telephone calls made through a local switch during a period of time. The information is represented as a graph in which the nodes in the graph represent telephone numbers and the edges represent telephone calls between the nodes. Both the nodes and the edges may be associated with various statistics about the traffic through the switch. For example, each edge may be associated with a statistic indicating the number of calls made between the nodes connected by the edge during the period of time in question and each node may be associated with a statistic indicating the total number of calls made by the node.

Display 301 has three major components, graph display 303, which displays part or all of the graph which represents the information, and control windows 311 and 317, which control the display of graph 303. All three components are implemented in a preferred embodiment as windows provided by the X Window System.

Graph Display 303

Graph display 303 is a "zoom" view which displays a part of the graph representing telephone calls. In graph display 303, nodes 305 represent telephone numbers; links 307 represent telephone calls. Statistics about the telephone numbers determine the color and size of the nodes 305; statistics about the telephone calls determine the color and width of the links 307. Here and in the following, "color" includes a gray scale or any other shading technique.

In accordance with the invention, the locations of the nodes 305 in graph display 303 are determined by the values of the statistic associated with the links connecting the nodes to other nodes; the more significant the values connecting a set of nodes to each other are, the closer the nodes in the set will be to each other and the closer they will be to the center of the graph. Further, the nodes in a cluster will be closer to each other and will thus be more "dense" than the nodes in the area surrounding the cluster. The clusters will thus appear to the user to be visually set apart from the other nodes. Cluster 309 is a large example of such a cluster; other smaller examples may be seen in graph display 303.

A user of display 301 can control graph display 303 by means of mouse 114 and control panels 311 and 317. In the preferred embodiment, the user can employ mouse 114 to alter the relationship between graph display 303 and the window in which it is being displayed. When the user employs mouse 114 to move pointer 640 to a position in graph display 303 and presses middle mouse button 114*b*, the result is a "zoom" into the part of graph display 303 which is centered on the pointer. To do a "zoom" out, the user simultaneously presses middle mouse button 114*b* and a shift key on keyboard 113. Finally, if pointer 640 is in graph display 303 and the user presses right mouse button 114*c*, a "pop-up" menu appears. The menu permits the user to select a variety of computations which rearrange the graph so that nodes with significant relationships are grouped together.

Histogram Window 311

Control window 311 is a histogram window. Such windows relate colors used in graph display 303 to values of statistics and are also used to control the display of nodes 305 and links 307 in graph display 303. A histogram window 311 may be displayed in display 301 for each of the statistics which is presently associated with the links and nodes in graph display 303. The horizontal axis of histogram 313 represents the range of values in the statistic; the vertical axis represents the number of nodes or links which have a given value. In the preferred embodiment, the range of values may be associated with a range of colors. In FIG. 3, the familiar "rainbow" range is being used, with the blue end of the range representing the lowest values of the statistic and the red end representing the highest values. The color associated with the value of a statistic for a node or link in histogram window 311 for the statistic determines the color in which the node or link will be displayed in graph display 303.

Histogram window 311 further may be used to define a mask which determines which nodes or links are used to make graph display 303. When a user presses left mouse button 14a and moves pointer 640 across histogram 313, the nodes or links whose statistic values lie in the section of histogram 313 across which the pointer moves are "turned on" in the mask, i.e., if the mask is used to control graph display 303, those nodes or links are part of graph display 303; if the user does the same but presses middle mouse button 14(b), the nodes or links whose statistic values lie in the section of histogram 313 across which the pointer moves are "turned off" in the mask, i.e., when the mask is used, the nodes or links are not part of graph display 303. When a node or link is "turned off", it plays no part whatever in the construction of graph display 303. There is no limitation on the number of areas of histogram 313 which are "turned on" or "turned off". Histogram window 311 is thus an example of a data selector of the type disclosed in Stephen G. Eick, "Data Visualization Sliders", submitted to ACM *Transactions on Computer-Human Interaction.*

Slider 315 in histogram window 311 controls a smoothing function which smooths the histogram according to a kernel density smoothing function. See B. W. Silverman, *Density Estimation for Statistics and Data Analysis*, Chapman and Hall, New York, N.Y., 1990. The slider is operated by moving pointer 640 to slider 315 and moving pointer 640 while depressing left mouse button 114a. As slider 315 is moved up, the amount of smoothing increases. Slider 315 and histogram 313 can be used together to locate and study interesting groups of nodes or links. First, slider 315 is used to decrease smoothing until interesting irregularities in histogram 313 become visible; then the mouse is used in histogram 313 as described above to make a mask which "turns off" all nodes or links but those whose statistic values are in the interesting areas in histogram 313.

There may be a number of histogram windows 311 simultaneously visible in display 301. If more than one of the histogram windows 311 controls the display of either the nodes 305 or the links 307, then the mask most recently defined for one of the histogram windows 311 applies to all of the other histogram windows 311 for the nodes or the links. Since that is the case, the histograms 313 in the other windows are made without reference to the nodes or links which the mask "turns off".

Control Panel 317

Control panel 317 selects the statistics used to construct the graph displayed in graph display 303, determines which histogram window 311 is being displayed, selects masks for links and nodes, and also determines how the statistics influence the size and shape of links 305 and nodes 307. Control panel 317 has three main parts: a node control portion 319 for controlling nodes, a link control portion 321 for controlling links, and a statistics list portion 323 which indicates the statistics available to control the nodes and links.

Beginning with statistics list portion 323, portion 323 specifies the names of statistics for nodes and links as well as names of lists of values which provide global masks specifying which nodes and links are to be displayed and lists of values which specify the shapes of the nodes. The statistics and lists for nodes specify a value for each node, while those for links specify a value for each link. If a name specifies a statistic, the user can make histogram window 311 for the statistic by moving pointer 640 to the name of the statistic in statistics list portion 323 and pressing right mouse button 14c. Histogram window 311 for the statistic will thereupon appear in display 301. Statistics and lists are related to nodes and links by using mouse 114 with left button 14a depressed to drag the name of a statistic or list to a slot in either link control portion 321 or node control portion 319. The aspect of the link or node controlled by the slot is then based on the values in the statistic or list specified by the name.

Continuing with node control portion 319, the portion has five slots in a preferred embodiment:

the Size slot is for a statistic which will determine the sizes of the nodes;

the Color slot is for a statistic which determines the colors of the nodes;

the Shape slot is for a list of values which determine the shapes of the nodes. The values in the list must correspond to the types of shapes available for the nodes;

the Mask slot is for a list of values which masks certain ones of the nodes; if the node is to be masked, its value in the list will be 0; otherwise, it will be 1; and the Selection slot represents the most recent mask defined on a histogram 313 for node data. To apply that mask to graph display 303, the user drags the word "selection" from the Selection slot to the Mask slot.

Link control portion 321 is similar, except that it only has the Size, Color, Mask, and Selection slots. The statistics in these slots control those aspects of the links in the same fashion as described above for node control portion 319. "Size" with regard to links specifies the width of the link 307 in graph display 303.

Continuing with other features of control panel 317, the numbers in parentheses at the top of node control 319 and link control 321 indicate the total number of links being displayed; the number following "Selection" indicate the number of nodes or links specified for display in the relevant histogram 313, and the number following "mask" indicates the number of nodes or links being displayed with the relevant mask. A comparison of these numbers with the numbers at the top of portions 319 or 321 indicates what proportion of the total numbers of nodes or links are currently visible in graph display 303.

Sliders 325 and 329 scale the node and link sizes established by the statistics in the relevant "Size" slots. By reducing the size of the nodes or links, the user can decrease clutter, and once the user has zoomed in on an area of interest, he can increase the size of the nodes or links in order to better appreciate the differences in the statistics encoded by size. Color scale button 331 allows the user to choose other color scales than the rainbow; in a preferred embodiment, a gray scale is also available. When "Directed" button 333 is selected, links 307 are displayed as thin isosceles triangles, with the broad end of the link at the source and the narrow end at the destination. The position, print, and fit buttons are of no interest for the present discussion; quit button 335 simply terminates execution of graph display program 117.

In other embodiments, display 301 may include a time control window. In such an embodiment, there are sets of statistics taken at different times, and the time control window includes a slider upon which sets of statistics are specified. Using the slider, the user can select which set of statistics he wishes to have determine the form of graph display 303, and if the user selects sets of statistics for more than one time, a graph display window 303 appears for each one of the selected times. The user can thus easily see how the passage of time has affected relationships between the entities represented by the nodes in the graph.

Detailed Implementation of a Preferred Embodiment

The following discussion of the detailed implementation will first explore the data structure used to represent display graph 303, will then explain how the appearance of the nodes and links is established, and will finally show how the nodes are positioned in accordance with the significance of their relationships with other nodes.

Figure 4:
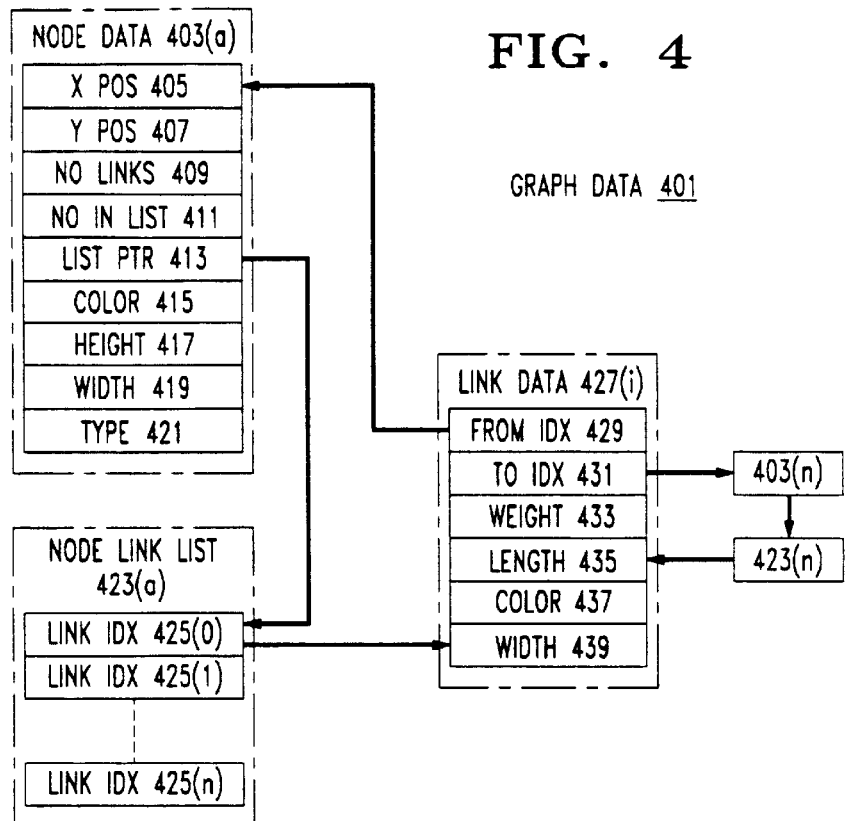
FIG. 4 is a drawing of a data structure which represents the graph in a preferred embodiment.
Figure 6:
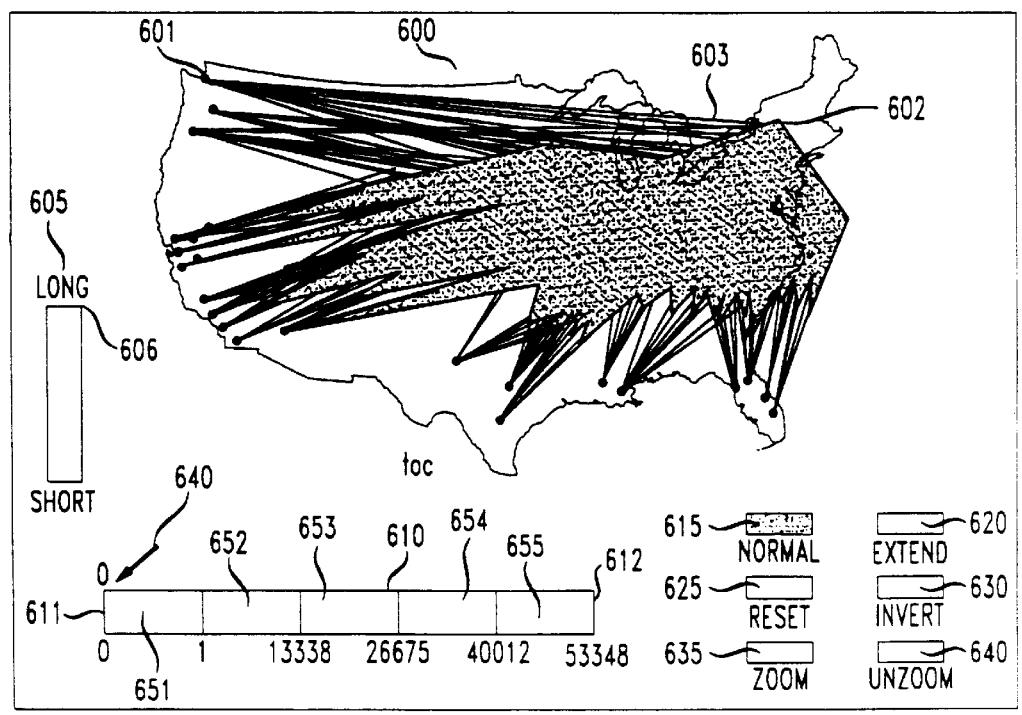
FIG. 6 is a drawing of a prior-art display.

Representing Display Graph 303: FIG. 4

FIG. 4 shows graph data 401, the data structure which represents display graph 303 in a preferred embodiment The main components of graph data 401 are node data 403 for each node 305 in display graph 303 and link data 427 for each link 307 in display graph 303. Each item of link data 426 includes indexes (429,431) to the items of node data 403 with which the link represented by link data 426 connects, and each item of node data 403 includes a pointer (413) to a node link list 423 of link indexes 425 which permit location of the items of link data 427 which represent links which begin or end at the node. Thus, link data 427(*i*) in FIG. 4 represents the link which connects the node represented by node data 403(*a*) with the node represented by node data 403(*n*).

Continuing in more detail, each item of node data 403 has the following fields:

X POS 405 and Y POS 407: These fields specify the location of the node 305 represented by node data 403 in display graph 303;

No. Links 409 indicates the current size of node link list 423 for node data 403;

No. in List 411 indicates the number of link pointers 425 currently in node link list 423;

Listptr 413 is a pointer to node link list 423;

color 415 specifies the color of the node 305 represented by node data 403;

height 417 specifies the height of the node 305;

width 419 specifies the width of the node 305;

type 421 specifies how the node is to be displayed.

In the preferred embodiment, the values of color 415, height 417, and width 419 may all be derived from statistics relating to the entity represented by node 305. There are four display types in the preferred embodiment: oval, oval with a border, rectangular, and rectangular with a border. How a node's display type is determined will be explained later.

The fields of link data 427 are the following:

Fromidx 429, an index of node data 403 for the node at which the link 307 represented by link data 427 originates;

Toidx 431, an index to node data 403 for the node at which the link 307 represented by link data 427 terminates;

weight 433, a statistic for the link which indicates the significance of the relationship represented by the link and which thus determines the position of nodes connected by the link relative to other nodes in display;

length 435; the current length of link 307 represented by link data 427;

color 437, the color of the link; in the preferred embodiment, the color is based on the statistic used for weight 433; and width 439, the current width of link 307.

As can be seen from the foregoing, graph data 401 contains all of the information required to draw display graph 303; what will be disclosed in the following is the manner in which the fields receive their values and the manner in which graph 303 is drawn from graph data 401.

File Data for Graph Display 303

Figure 5:
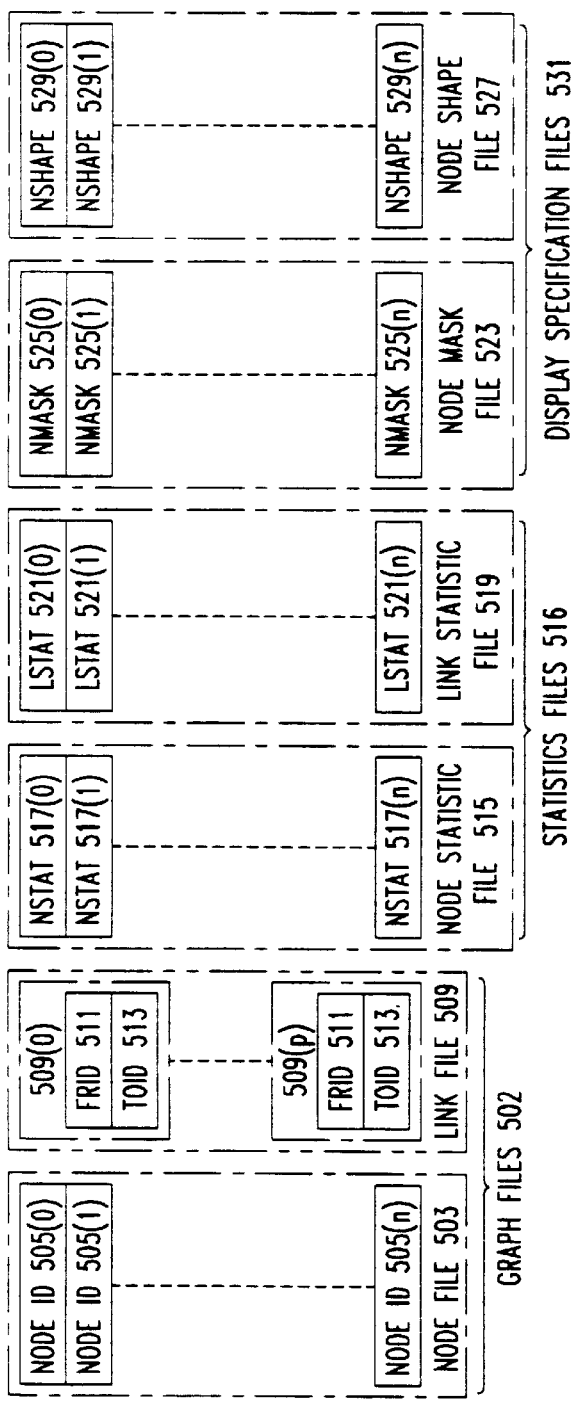
FIG. 5 is a drawing of the files used in a preferred embodiment.

The data used to generate graph display 303 is contained in a set of files. FIG. 5 shows set of files 501 and the individual files which are its members. The first two files are graph files 502, which specify the nodes and links in graph display 303. Node file 503 is simply a list of node identifiers 505, one for each node 305 to be displayed in graph display 303. In a preferred embodiment, there is a unique node identifier for each node 305 and the node identifiers may be sorted into an ordered list. The second file in graph files 502 is link file 507; it is a list of link entries 509, one for each link in graph display 303. Each link entry 509 contains two node identifiers 511; one, from identifier (FRID) 511, identifies the node 305 which is the source of the link represented by link entry 509; the other, to identifier (TOID) 513, identifies the node 305 which is the destination of the link.

The statistics to be associated with the nodes and links are contained in statistics files 516; there may be any number of these files; names of the available files appear in variables portion 323 of control window 317. When a statistics file 516 contains statistics associated with nodes, it is a node statistic file 515. Such files have one entry 517 for each node 305 in graph display 303. The entry for a given node 305 contains the value of the statistic for the given node and has the same position in node statistic file 515 as the node ID 505 for the given node has in node file 503. When a statistics file 516 contains statistics associated with links, it is a link statistic file 519; again, there is an entry 521 with a value for the statistic for each link and the entry 521 for a given link has the same position in link statistic file 519 as entry 509 for the given link has in link file 507.

There may also be any number of display specification files 531. These filed may specify the shapes of nodes 305 and may also define masks. Files in the later category are termed files. Two display specification files 531 are shown in FIG. 5; one of them, node mask file 523, contains an entry 521 for every node listed in node file 503; the entry contains the value 0 if the node is not to be displayed and 1 if it is to be displayed. Again, the entry for a given node occupies the same position in node mask file 523 as the node identifier for the given file occupies in node file 503. The other, node shape file 527, is structured the same way as node mask file 523. Entry 529 in node shape file 527 for a given node has a value which indicates the display type of the node. In the preferred embodiment, there are four display types, and entries 529 must contain integers between 1 and 4. Link mask files (not shown) work the same way as node mask files, except that there is an entry for each link in link file 507.

Figure 2:
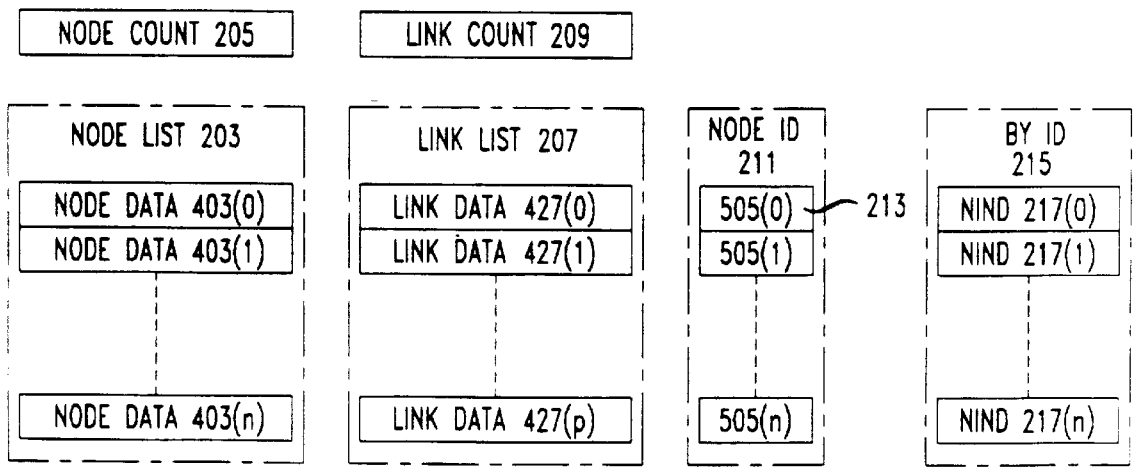
FIG. 2 is a drawing of further data structures which represent the graph.
Figure 7:
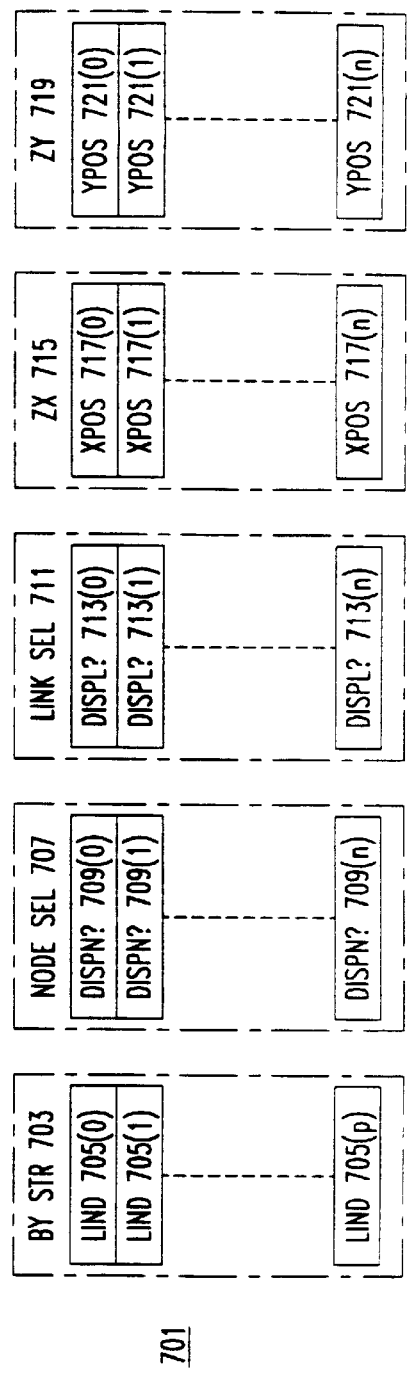
FIG. 7 is a drawing of data structures which affect the display of the graph.

Memory Data Structures for Display Graph 303: FIGS. 2 and 7

The data structures for display graph 303 are maintained in memory 115 as graph lists 201. Graph lists 201 are part of graph data 119. The first of these data structures is node list 203, which is a list of node data structures 403. Node Count 205 is a value which indicates the number of nodes in node list 203; similarly, link list 207 is a list of link data structures 427, and link count 209 indicates the number of links in link list 207. The link indexes 425 in node link list 423 are indexes of link data 407 in link list 207; similarly, Fromidx 429 and Toidx 431 in link data 427 are indexes of node data 403 in node list 203. The node data 403 in node list 203 has the same order as the nodes in node file 503, and the link data in link list 207 has the same order as the links in link file 507.

Node data 403 for a given node is related to the node identifier 505 for the given node by means of NodeID list 211 and byID list 215. NodeID list 211 is simply a list of node IDs 505 from node file 503 for the graph currently being displayed. The node IDs are in the same order as they are in node file 503 and as the node data 403 is in node list 203. ByID list 215 is a list of indexes into NodeID list 211 and node list 203. There is an index for each node, and the indexes in the list are ordered by the sorted order of the node identifiers. The list is used by a function called FindNode which takes a node identifier and returns the index of the node in nodeID list 211 and node list 203.

Constructing Lists 201

In a preferred embodiment, graph display code 121 which produces display 301 is invoked using a command line like this: <prog_name> <options> <node file> <link file><data file list>

The node file argument specifies node file 503, the link file argument specifies link file 507, and the data files argument specifies a list of statistics files 516 and display specification files 531.

The options in a preferred embodiment include options specifying whether graphic display 303 and histogram 313 are to be displayed using a rainbow range of colors or a gray scale range and an option specifying a file of node positions. The latter option is used to simply redisplay a previously-constructed graphic display 303.

On commencement of execution, graph display program 121 initializes and instantiates the widgets for the windows of display 301 and then reads the color display option and sets state as required by the option. Next, the program reads node file 503 one entry 505 at a time. As each entry is read, the node ID is added to nodeID list 211, an item of node data 403 is added to node list 203, and byID list 215 is reordered as required by the new node ID. Then the program reads link file 507 one link element 509 at a time. As each link element is read, a link data item 427 is added to link list 207. The FindNode function is used to convert FRID 511 and TOID 513 to indexes of the node data 403 for the nodes represented by the IDs and those indexes are placed in Fromidx 429 and Toidx 432 respectively. Thereupon, the indexes are used to locate the node data items 403 for the nodes and the index of the link data item 427 is added to each node's node link list 423.

If a position file is specified, the values in the position file are read into position fields 405 and 407 for each node data item 423; otherwise, the values of position fields 405 and 407 are set according to an algorithm which starts at the top of node list 203 and sets position fields 405 and 407 in the first node data item to 0,0, that is, the center of display graph 303. The position fields of each node in turn are set so that the nodes appear as rings of hexagons in display graph 303, with each node at essentially the same distance from all of its neighbors. As each node is placed, the distances of the links between it and previously-placed nodes are computed and placed in length field 435 of link data 427 for the node.

The next stage is to set up control panel 313 for display. In Nodes portion 319, the value in node count 205 is displayed at the top and mask and selection are set so that all nodes are on; Link portion 321 is set up in analogous fashion. Then the program sets up variables portion 323 so that the names of the statistics files 516 and the display specification files 531 provided as arguments to the command line are displayed in variables portion 323.

When the program has done all of this, it "realizes" the widgets for the windows making up display 301 and the windows appear in display 301. If no position option was specified, display graph 301 appears at this time as a graph in which the nodes are arranged in hexagonal rings and the links connect the nodes as required by their positions and all nodes and links have the same default colors.

Once the program is running, the X Window System responds to mouse events in display 301 by invoking "callback routines" in graph display code 121 which set values used to redraw display 301. When the X window system next redraws the display, the appearance of the display is determined by those values. One such mouse event is the assignment of a statistic to the nodes. As previously explained, to assign a statistic to the nodes, the user drags the name of a file of statistics for the nodes to the relevant field in nodes portion 319. In response to that operation, the program uses the values in the statistics to set the values of the relevant fields in node data 403. For example, if the statistics file selected is dragged to the "size" field, the values in the file are used to compute the values in height field 417 and width field 421. Assigning a statistic to the links works in exactly the same fashion, except that the fields set are in link data 427. When the changes have been made to graph data 401, the program redraws display graph 303 in accordance with the values currently in graph data 401.

When the user assigns a statistic to the color field in node portion 319, the program maps the range of values for the statistic onto a range of color values representing the range of colors used in the display. The program then sets color field 415 for a node to the color value corresponding to the value of the statistic for the node. When the X Window System next redisplays display 301, it displays the node in the specified color. If the user then employs the mouse as described above to request a histogram window 311 for the statistic, the program sets up the data structures for a histogram window 311 for the statistic and when the X Window system next redraws display 301, histogram window 311 appears with a histogram 313 for the statistic.

In links, the statistic which determines the color of a link is also used to position the nodes; consequently, assigning a statistic to the color field of links portion 321 not only sets color field 437 in link data 427 for each link, it also sets weight field 433. The program maintains a list in which the nodes are ordered by the value of their weight fields, beginning with the node with the largest value in the field. That list appears in FIG. 7 as byStr 703. The list has an entry for each link, and the entry 705 contains the index of the link data 427 for the link in link list 207. Each time weight field 433 for a link is set, bySr 703 is reordered as required for the new value of weight field 433.

As previously explained, the user may define masks for nodes or links by dragging the mouse across parts of a histogram 313; the data structures in graph data 119 which retain the masks thus defined are nodeSel 707 and linkSel 711, shown in FIG. 7. NodeSel 707 has an entry for each node, with the entries being in the order of the nodes in node list 203. Each entry may have the value 1 if the node is to be displayed or the value 0 if it is not to be displayed. These values are set in nodeSel 707 when the mouse is dragged across histogram 313 for the nodes. LinkSel 711 is the same except that it has an entry for each link in link list 207, the entries are in the same order, and the values are set by dragging the mouse across histogram 313 for the links.

NodeSel 707 and linkSel 711 may additionally be set from mask files. That is done by dragging the name of the mask file to the mask field in node portion 319 for nodes or to the same field in link portion 321 for links. In both cases, when the X Window System next redraws display graph 303, it uses or ignores the nodes and/or links in making display graph 303 as specified by the values in nodeSel 707 and linkSel 711. NodeSel 707 and linkSel 711 further determine what nodes or links are taken into account in making histograms 313. If a node is turned off in nodeSel 707, statistics for the node are not used to make histograms for node statistics; similarly, if a link is turned off in linkSel 711, statistics for the link are not used to make histograms for link statistics.

Rearranging Graph Display 303

An important property of graph display 303 is that the program rearranges it so that nodes having more significant relationships to each other in terms of the statistic used to determine the color of the links and the value of weight field 433 tend to cluster. The algorithm used to make the nodes cluster arose out of the following theoretical considerations:

Clearly, if the nodes are to cluster, the relationship between the weight of a link and the distance between nodes should be inverse, with nodes that have large links having short separation. The simplest form of such a relation is to require that the distance between two nodes be inversely proportional to the size of the link:

$$d_{ij} \propto \frac{1}{w_{ij}}$$

where $d_{ij}$ is the displayed link length, $w_{ij}$ is the weight of the link.

The obvious candidate for such a placement algorithm is the statistical technique of multidimensional scaling, or MDS, disclosed in Kruskal, J. B., and Wish, M., *Multidimensional Scaling*, Sage Publications, Newbury Park, Calif. Given a matrix of dissimilarities, $\delta_{ij}$, this method fits positions to the nodes that minimize $\Sigma(d_{ij}-\delta_{ij})^2$. Setting $$\delta_{ij} = \frac{1}{w_{ij}}$$

would give a layout that should attempt to satisfy the above relationship.

Unfortunately this does work well for two reasons. The practical reason is that the method requires the inversion of the matrix of dissimilarities, which can be expensive for large systems. Another drawback can be seen by considering the quantity to be minimized:

$$\Sigma(d_{ij}-d_{ij})^2 = \Sigma\left(d_{ij}-\frac{1}{w_{ij}}\right)^2 = \Sigma\frac{(d_{ij}w_{ij}-1)^2}{w_{ij}^2}$$

The method tries to set $d_{ij}w_{ij}$ to be close to unity (as required), but the minimization is weighted by $$\frac{1}{w_{ij}^2},$$

with the result that small links have an inordinate importance relative to large ones—exactly the reverse of the situation we would like.

Another method that has been used in a number of guises is that of directly minimizing an error function on the nodes. Using the function $\Sigma(d_{ij}-\delta_{ij})^2$, for example, gives a method equivalent to MDS. To implement minimization methods we start with some reasonable positioning of the nodes and use a method such as Newton's method or steepest descent to find a layout that minimizes the function (see Burden, R. L, and Faires, J. D., *Numerical Analysis*, Duxbury Press, Boston, Mass. 1985, for details). Minimization methods are also known as force-based algorithms, as they are equivalent to releasing a set of nodes under a system of inter-node forces and letting them find an equilibrium layout. A common example of such an algorithm is to model the nodes as having springs attached between them, the strength of each spring being proportional to the size of the corresponding link. Some repulsive force between nodes is also required to prevent the nodes from coalescing.

Although widely used, the spring algorithm is not a perfect model. It certainly brings nodes closer together when the links are stronger, but it has a tendency simply to bring nodes which have a lot of strong links together, regardless of whether they have strong links to each other. It also tends to fill an area, since all nodes want to get as close to each other as the repulsive force will allow. Thus nodes will tend to fill in gaps. This behavior is useful in that it fits as many nodes as possible into an area, but it tends to hinder the ability to spot groups, as groups are always embedded in a sea of less important nodes that have drifted beside them.

We elect instead directly to minimize the function $$\Sigma\left(w_{ij}-\frac{1}{d_{ij}}\right)^2 = \Sigma\frac{(d_{ij}w_{ij}-1)^2}{d_{ij}^2}$$

This gives the required relation, and also states that our strongest interest is in close nodes, where the weights are high. In contrast to the spring method, nodes with weak links are moved to positions well away from the other nodes, so that important groups are readily identified.

The hierarchy is also taken advantage of in the layout algorithm. Starting with the root node (which we place at some appropriate center, usually the origin), we consider the sub-network generated by its children and use our minimization algorithm to place them. We then re-center and re-scale to place the children at the parent's location and recursively use this algorithm on the child nodes. This gives us a layout algorithm that can deal with any depth of hierarchy, and which is comparatively fast as the slow part (the minimization routine) is only required to work on sub-networks.

Detailed Implementation of Rearrangement

In a preferred embodiment, two techniques are used in rearranging display graph 303 to reflect the significance of relationships expressed in the links. The first technique quickly moves nodes into an approximation of the proper arrangement by swapping nodes if the swap results in bringing nodes with significant relationships closer together; the second technique refines the approximation by moving all of the nodes a small distance in a direction which brings their significant relationships closer together.

The first technique will be termed herein SwapStep and the second will be termed DescendStep.

SwapStep takes as an argument a specified number of steps. For that number of steps, SwapStep does the following: first, it selects two nodes at random; if they are the same, it iterates again. Otherwise, it computes the node potential for each of the two nodes. The node potential is the sum of the link potentials for each link connected to the node. In a preferred embodiment, the link potential is computed as follows:

$$(length*weight-1)^2$$

where length is the value of length field 435 of link data 427 and weight is the value of weight field 433.

Then SwapStep adds the two node potentials to compute a total node potential for the nodes in their present position. Next, the two nodes are "swapped" by setting XPOS 504 and YPOS 407 in node data 403 for each of the nodes to the corresponding values from the other nodes. Thereupon, the values of the length fields 435 for any links connecting the two nodes are recomputed to reflect the new positions. This done, the node potentials are recalculated as explained above and added. The result is compared with the total node potential for the original position. If the result is greater, the nodes remain in their present position; if it is less, they are swapped back to their original positions.

In order to avoid local minima, SwapStep also swaps the nodes if a value based on a random number is greater than a parameter whose value is based on the number of swaps made where the result was not greater. The parameter is initialized to 1 before SwapStep begins its iterations. This technique for avoiding local minima is termed synthetic annealing and is described in Lawrence Davies, *Genetic Algorithms and Simulated Annealing*, Pitman, London.

Before DescendStep begins, the program computes the network potential of the entire graph display 303. The network potential is the sum of the node potentials for all of the nodes in graph display 303. DescendStep employs two lists to hold results of computations. These appear as zx 715 and zy 719 in FIG. 7. Each list has one entry for each node and the entries for the nodes are in the same order as their node data items 403 in node list 203. The entries 717 in zx 715 contain offsets to the x coordinates, and the entries 721 in zy 719 contain offsets to the y coordinates. These offsets indicate the direction the nodes should move in to lower the potential of the system. Mathematically, zx and zy form the 2n-dimensional gradient of the potential with respect to the node positions.

Like SwapStep, DescendStep takes an argument which specifies a number of steps. The main loop of the routine executes as many times as specified in the argument. The first step in the computation is to work through node list 203. For each node data item 403, DescendStep calculates the node partial derivative for the x and y positions of the node. The node partial derivative for the x position is stored in the zx element 717 for the node and the node partial derivative for the y position in the xy element 721 for the node. The node partial derivative is computed from the link partial derivatives for the links specified in the node's node link list 423. Each x link partial derivative is computed as follows:

$$\frac{weight * (length * weight - 1) * (fromX - toX)}{length}$$

where weight is the value of weight field 433 in link data 427 for the link, length is the value of length field 435, fromX is the XPOS 405 for the node specified by Fromidx 429, and toX is the XPOS 405 for the node specified by Toidx 431. The y link partial derivative is computed in the same way, except that fromX and toX are replaced by their equivalents, fromY and to Y. The link partial derivative for x is computed from the node partial derivatives for x by adding x link partial derivatives for links for which the node is the from node to a sum and subtracting the x link partial derivatives for the other links from the sum. The same is done with y link partial derivatives to compute the x node partial derivative.

Next, DescendStep normalizes the gradient for the entire graph. The gradient determines the direction in which all of the nodes in the graph will be moved and we require that the vector size of the gradient be unity. We do this by computing for each node the sum of the square of the x node partial derivative and the square of the y node partial derivative and adding together the sums so created. The size of the gradient is then determined by taking the square root of that sum. The contents of each of the elements of zx 715 and zy 719 are then divided by this quantity, normalizing the gradient."

Having determined the direction in which the nodes are to be moved, DescendStep next computes the distance they are to be moved. If the last distance (a global variable descDisp) was greater than 0, a variable a3 is set to 1; The distance contained in a3 is then used to "move" the nodes by recomputing their the x and y positions. The recomputation for the x position is done by adding the current value of XPOS 405 for the node to the product of the distance and the value of the element 717 for the node in zx 715; the recomputation for the y position proceeds analogously. When the recomputation has been done for all the nodes, the graph potential is computed; thereupon, the nodes are "moved" back to their original positions. The graph potential is returned and assigned to a variable which we will call g3.

The value of g3 is then compared with the value of a variable called g1, which is set from the global variable descPotr, which contains the graph potential produced by the last iteration (or the initial graph potential in the case of the first iteration). If g3>g1, the value of a3 is reduced, the nodes moved, and the current graph potential recomputed as described above in iterations until the current graph potential is less than or equal to the last graph potential. The displacement distance is then divided by 2 again and assigned to a variable a2. a2 is then used as described above to move nodes and compute the graph potential. The resulting graph potential is assigned to the variable g2.

At this point g1, g2, g3, a2, a3, and a variable a1 with the value 0 are used to compute a final displacement distance a0. If we consider the potential to be a function of the distance we move the nodes in the gradient direction, we have three sample points, since we have calculated that moving a1 gives potential g1, moving a2 gives potential g2 and moving a3 gives potential g3. We fit a cubic polynomial to these data points and solve for the lowest potential under the polynomial model. We do this by the formulas $$h1=(g2-g1)/(a2-a1);$$

$$h2=(g3-g2)/(a3-a2);$$

$$h3=(h2-h1)/(a3-a1);$$

$$a0=0.5*(a1+a2-h3);$$

which gives our distance a0. a0 is then used again to move nodes and compute the graph potential which is stored in the variable g0. The four values of the potential are compared to each other and the lowest value is stored in the global variable descPot. The global variable descDisp is set to the distance which corresponds to this lowest potential. Finally, the graph is "moved" to the new position for this iteration. XPOS 405 is recomputed for each node as follows:

$$XPOS+descDisp*zx[i]$$

where zx[i] is the element in zx 715 for the node. YPOS 405 is recomputed analogously. Length values 435 in the links are then recomputed in the manner previously described to agree with the new position of the node. The final values of descDisp and descPot are then used as described above in the next iteration.

In a preferred embodiment, the user employs the previously-described pop-up menu to select SwapStep or DescendStep and the number of iterations to be performed by each technique. In the preferred embodiment, the user may choose values of 10,000 and 5,000,000 iterations for SwapStep and 10 and 1000 iterations for DescendStep. The larger numbers of iterations of course require more time than the smaller numbers and are intended for use when the user wishes the display to show finer distinctions. In general, it is presumed that the user will first use SwapStep and then DescendStep, and in other embodiments, a single "rearrange" command might perform the operations in that order.

When one of the techniques has been selected and the nodes have been "moved", graph display 303 is redrawn using the information in node data 403 and link data 427 for each of the nodes. First, those links which linkSel 711 indicates should appear are drawn in the order specified in byStr 703; then those nodes which nodeSel 707 indicates should appear are drawn in the order in which they appear in node list 203.

Other Applications of the Display Technique

The display technique disclosed herein for display graph 303 may be used in any situation where data may be expressed in terms of nodes and links specifying relationships between the nodes. Other examples of its application include the analysis of communications patterns in an E mail network, the analysis of how changes in the files and modules of a large software product relate to changes in other files and modules, and the analysis of relationships between products bought in supermarkets.

Conclusion

The foregoing Detailed Description has disclosed to those of ordinary skill in the art how to make and use a system in which nodes in a graphical display are rearranged according to the significance of the links connecting them in such fashion that nodes with more significant connections to each other appear in groups which are visually separate from the other nodes. Although the embodiment disclosed herein is the best presently known to the inventors, it will be immediately apparent to those skilled in the art that systems employing the basic principles of the one disclosed herein may be implemented in many ways.

In particular, the control windows may take different forms, as may the manner in which the statistics are represented in files and the manner in which the graph is represented in memory. In some embodiments, there may be no need to assign statistics to nodes or links, to display histogram windows, or to mask nodes or links. Further, some embodiments may show relationships purely by means of location, and may not vary the size, shape, or color of nodes or links. Finally, the graph may be rearranged to the same effect as in the preferred embodiment by means of rearrangement algorithms different from those disclosed herein.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted with the full breadth permitted by the law.

What is claimed is:

1. Computer apparatus for representing information which describes relationships between entities, the apparatus comprising:

a display for displaying a graph whose nodes are a plurality of entity representations, each entity representation corresponding to one of the entities;

means responsive to the information for arranging the entity representations in clusters on the display, the entity representations in a cluster being representations of entities whose relationships with each other as determined from the information are more significant than their relationships with others of the entities, the display further displaying edges belonging to the graph, the edges representing the relationships, each edge is associated with a value of a statistic which is indicative of the relationship represented by the edge, at least a portion of the information being independent of the physical layout of said graph and said statistic being a function of at least said portion, the statistic being a weight; and the means for arranging the entity representations positioning the entity representations in the clusters according to the weights of the edges.

* * * * *